United States Patent [19]

Reichard et al.

[11] Patent Number: 4,974,819

[45] Date of Patent: Dec. 4, 1990

[54] MOUNT FOR CONTROLLING OR ISOLATING VIBRATION

[75] Inventors: Richard L. Reichard; Thomas A. Knurek; Terry L. Houston, all of Auburn; Gary L. Hipsher, Logansport, all of Ind.; Jamal J. Mousavi, St. College, Pa.

[73] Assignee: Cooper Tire & Rubber Company, Lima, Ohio

[21] Appl. No.: 829,676

[22] Filed: Feb. 14, 1986

[51] Int. Cl.$^5$ ............................................. F16F 13/00
[52] U.S. Cl. ................................. 267/140.1; 188/312; 248/562; 248/636
[58] Field of Search ............................ 267/8 R, 140.1; 280/710, 716; 248/562, 636; 180/300, 902, 312

[56] References Cited

U.S. PATENT DOCUMENTS

| | | | |
|---|---|---|---|
| 2,069,261 | 2/1937 | Monnet | 251/7 X |
| 2,421,585 | 6/1947 | Thiry | 267/140.1 |
| 2,735,642 | 2/1956 | Norman | 138/45 X |
| 3,642,268 | 2/1972 | Hipsher | 267/57.1 R |
| 3,698,703 | 10/1972 | Hipsher | 267/140.1 X |
| 4,573,656 | 3/1986 | Yoshida et al. | 248/562 |
| 4,621,795 | 11/1986 | Eberhard et al. | 267/8 R |
| 4,645,189 | 2/1987 | Quast | 267/140.1 |
| 4,681,306 | 7/1987 | Hofmann et al. | 267/140.1 |
| 4,697,793 | 10/1987 | Reuter et al. | 267/195 |
| 4,697,794 | 10/1987 | Brenner et al. | 267/195 |

FOREIGN PATENT DOCUMENTS

| | | | |
|---|---|---|---|
| 2948408 | 6/1981 | Fed. Rep. of Germany | 267/140.1 |
| 3245653 | 4/1984 | Fed. Rep. of Germany | 267/140.1 |
| 3336965A1 | 5/1985 | Fed. Rep. of Germany | |
| 2394715 | 1/1979 | France | 267/140.1 |
| 57-94147 | 6/1982 | Japan | 267/140.1 |
| 58-54248 | 3/1983 | Japan | 267/140.1 |
| 60-179320 | 9/1985 | Japan | 267/140.1 |
| 60-184740 | 9/1985 | Japan | 267/140.1 |

Primary Examiner—George E. A. Halvosa
Attorney, Agent, or Firm—Biebel, French & Nauman

[57] ABSTRACT

An isolating mount for connecting two parts or mechanisms includes a rigid bushing surrounded by a resilient block which includes cavities on opposite sides of the bushing located along a first plane parallel to the longitudinal axis of the bushing and passage formed between the cavities. A quantity of liquid fills the cavities and a passage, providing a liquid column of predetermined inertia in the passage between the cavities for controlling forces transmitted through the bushing to provide tuning of the damping characteristics of the mount to preselected frequencies of vibration. A rigid outer body surrounds and contacts the block and exerts compressive force thereon substantially along the first plane. The bushing is connected to one of the two parts to be isolated and the outer body is connected to the other of the two parts. The cavities are closed whereby the liquid is confined within the cavities and passage so displacement of the block in response to forces acting along the first plane will result in displacement of liquid from one cavity to the other through the passage.

The length and diameter of the passage are selected to provide a predetermined resonant frequency and a damping ratio of substantially 1.0. Various modifications are described for increasing the length of the passage and/or controlling its effective cross-sectional area for this purpose.

8 Claims, 7 Drawing Sheets

MOUNT FOR CONTROLLING OR ISOLATING VIBRATION

CROSS-REFERENCE TO RELATED APPLICATION

This application contains disclosure related to a copending application Ser. No. 825,825 filed Feb. 4, 1986, now U.S. Pat. No. 4,687,188, and assigned to the same entity as this application.

BACKGROUND OF THE INVENTION

This invention relates to a mount used for connecting two members while isolating and/or controlling the transfer of motion, and particularly motion due to vibration, between these members. Mounts of the general type are described in U.S. Pat. Nos. 3,147,964; 3,508,745; 3,642,268; and 3,698,703.

The earlier type of mount disclosed in said U.S. Pat. No. 3,147,964, utilizes primarily the directed energy absorbing characteristics of a compressed rubber bushing to control the transmission of vibration between two members, and also to provide a certain mount of shock isolation in the mounting of one mechanical member to another, while still mechanically connecting the members as desired. These members can be any of a vast variety of devices such as different parts of mechanisms or vehicles, supports for machinery, and packaging supports for large masses. Of particular interest are the connections of chassis and body parts in vehicles. For example, the mounting of an engine in an automobile requires control and isolation in six different degrees of freedom, namely motion along X, Y and Z axes and rotation about these axes, namely roll, pitch and yaw. In this area of application alone, the modern demands for vibration control isolation and adequate support and anchoring present sophisticated mount design requirements which are aggravated by the need to accomodate some degree of misalignment which is to be expected in mass production systems.

The aforementioned '268 and '703 patents disclose such mounts wherein the vibration isolating effect of a resilient (such as rubber) member coupled between the members is modified by the placement of a damping liquid in cavities located on opposite sides of and within the resilient member. These cavities are connected through a passage which limits the flow of the liquid between the cavities, thus further damping the motion of the resilient member along a plane extending through the two cavities. Details of the hydraulic damping conditions are disclosed particularly in the '268 patent, wherein it is stated that "various dynamic rates of the bushing can be readily controlled through the judicious selection of a properly sized orifice between the pockets" and, in reference to an embodiment with an internally tapered tube inserted in the connecting passage, this "type of tube would give damping characteristics similar to a corresponding tube having a uniform diameter corresponding to the minimum diameter of" the modified tube. Thus it appears that these prior art patents teach the important parameter is the friction effect of the liquid, and adjusting damping action is accomplished by the proper selection of the diameter, or cross-sectional area, of the connecting passage between the liquid filled cavities.

Also with respect to such prior art fluid damped mounts, the metal to rubber bonds in those devices described are of the post-bonded type, which means that the bond is form by assembling separate rubber and metal parts, with an adhesive therebetween which is later thermally activated to provide a bond between these parts. Various types of such bonding are discussed in those patents. In many applications of mounts such a bond is not reliable from a physical adhesion standpoint, and may also have discontinuities which alter the desired continuous metal-rubber bond that is needed.

It is generally recognized in the art that a good bond between the metal and rubber parts in such mounts introduces an impedance mis-match into the mechanical system which is effective in minimizing the transmission of vibrational energy across this bond. Each such interface in the path along which vibrational energy can be directed will substantially damp the vibration and provide additional isolating capacity. Thus, it is also desirable to maximize the use of such interfaces as possible without compromising the over-all mechanical design of a mount.

SUMMARY OF THE INVENTION

An isolating mount for connecting two parts or mechanisms, such as for mounting an engine in a compartment, includes a rigid bushing surrounded by a resilient block of rubber or the like having one or more cavities adjacent but spaced from the bushing, preferably a pair of cavities located along a first plane parallel to the longitudinal axis of said bushing. A passage leads from the cavity, or between the cavities, and a quantity of liquid fills the cavities and passage, providing a liquid column of predetermined inertia in the passage for controlling the damping of forces transmitted through the bushing and to provide tuning of the spring rate and damping characteristics of the mount to preselected frequencies of vibration. A rigid outer body surrounds and contacts the block and exerts compressive force thereon. This force may be selective, for example, substantially along the first plane to pre-load the block under compression along the first plane. The bushing is connected to one of the two parts to be isolated and the outer body is connected to the other of the two parts. For example, the bushing may be coupled to a mounting pad on an engine, and the outer body may be attached to the structure of the compartment housing the engine.

The cavities are closed whereby the liquid is confined within the cavities and passage so displacement of the block in response to forces acting on or through the mount will result in displacement of liquid from one cavity to the other through the passage.

The invention teaches how to provide between the cavities a connecting passage or bleed of proper size and shape to tune the mount to desired damping characteristics, taking into consideration modifications to both spring rate and damping. Included are modifications for lengthening the passage both externally and internally of the mount, and for varying the cross-sectional opening through the passage both internally and externally, all toward the end of providing a column of liquid of predetermined inertia which will function as a fluid oscillator of predetermined frequency. The selection of proper length and diameter of the passage will also provide a mount having a damping ratio of substantially 1.0, which is the ideal ratio for a critically damped mount. Also disclosed are modifications for altering the frequency of oscillation of the damping liquid independantly of the passage design, such as by forming a chamber internally of one or both cavities using a flexible diaphragm or the like, and changing the response of such diaphragm to liquid motion in the mount by pressurizing the opposite side of such diaphragm, or adding mass to it.

The principal object of this invention is, therefore, to provide a novel and unique isolating mount for connecting two parts or mechanisms, for example such as mounting an engine in an automobile engine compartment; to provide such a mount which includes a rigid bushing surrounded by a resilient block having at least one cavity located in predetermined spaced relation to the bushing, and preferably two cavities formed on opposite sides of the bushing along a plane parallel to the longitudinal axis of said bushing, and in which a passage of predetermined diameter and length extends from the cavity or cavities, and a quantity of liquid fills the cavity (or cavities) and passage, providing a liquid column of predetermined inertia in the passage such that displacement of the block in response to forces acting along the first plane will result in displacement of liquid from a cavity through the passage thereby affecting forces transmitted through the bushing to provide tuning of the damping characteristics of the mount to preselected frequencies of vibration; to provide such a mount in which a rigid outer body surrounds and contacts the block and exerts compressive force thereon substantially along the first plane; to provide such a mount in which the length and diameter of the passage are selected to provide a predetermined resonant frequency and a damping ratio of substantially 1.0; and to provide various modifications of the mount construction for increasing the length of the passage and/or controlling its effective cross-sectional area for this purpose.

Other objects and advantages of the invention will be apparent from the following description, the accompanying drawings and the appended claims.

DESCRIPTION OF THE PREFERRED EMBODIMENT

Referring to the drawings, a mount constructed in accordance with a preferred embodiment of the invention is intended to accomodate and control motion between two parts over six different degrees of freedom. For an understanding of the following description, the transverse axis is designated X—X in FIG. 11, the longitudinal axis is designated Y—Y (FIG. 10), and the vertical axis is designated Z—Z in FIG. 11. Mounts provided by the invention control motion along planes containing these axes, and also control motion in rotation about such axes.

The mount provided by the present invention has a central assembly which includes a rigid (such as steel) tube 10 or bushing around which is molded, and bonded to the tube, a resilient mass or block 12 of rubber or equivalent distendable material. The tube 10 is intended to have its longitudinal axis parallel to, or coincident with, the Y—Y axis. The top 14 and bottom 15 of the block 12 have generally parallel relatively flat surfaces 20 and 21 with openings 22 and 23 therein which define the outer open boundaries of a pair of cavities 25 and 26 molded into the block. These cavities are located opposite (top and bottom) the tube or bushing 10, preferably but not necessarily centered along a plane which bisects the longitudinal axis of the tube, and which contains the Z—Z axis.

The sides 27 and 28 of the block transverse to the X—X axis are formed to a selected contour, usually being mirror images of each other. In general, the "hour glass" shape illustrated provides desired resistance of the mount to displacement of the tube 10 and the block along the transverse or X—X axis of the mount. The central outwardly extending rib on these sides, indicated at 29, provides bumpers which will contact rigid mount structure (as later described), should such displacement be excessive, and thereby introduce compression resistance of the block material to such excessive movement. The other or fore/aft sides 31 and 32 of the block 12 are essentially flat, but with the ends of the tube or bushing 10 protruding therefrom. If desired, the sides 31, 32 may also be contoured to introduce controlled resistance along the Y—Y axis and/or to modify the spring rate along the Z—Z axis.

The top and bottom 14 and 15 have respective plates 34 and 35 (referred to hereafter as end plates) molded and thus bonded thereto, with central openings that coincide with the openings 22 and 23, and with outwardly extending flanges 36 and 37 on their respective perimeters. A connecting passage 40 is formed, offset from tube 10, to connect the cavities 25 and 26, and optionally a rigid tube 42 of predetermined inner diameter can be fitted into this passage to provide control of its opening during operation of the mount, at which time the resilient material of the block will be distorted or distended.

Figure 3:
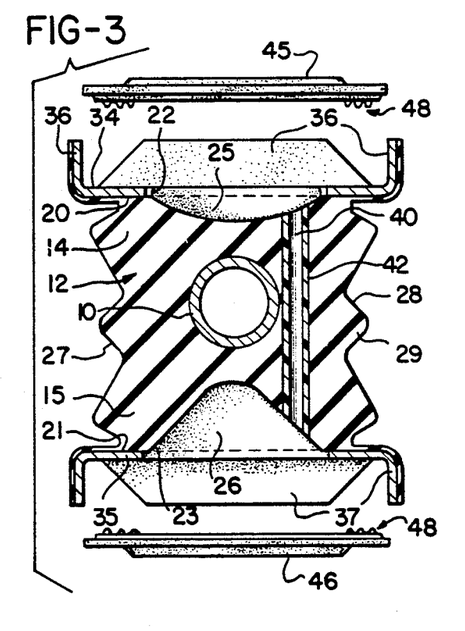
FIG. 3 is a cross-sectional view taken along line 3—3 in FIG. 1, with covers shown in position for attachment.
Figure 4:
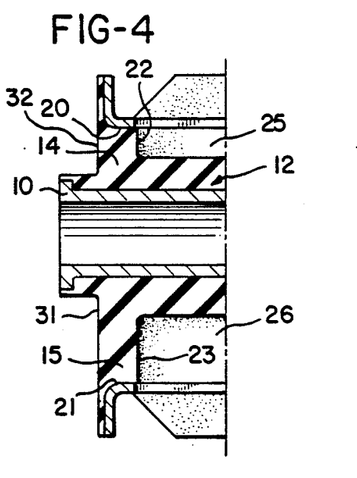
FIG. 4 is a partial cross-sectional view taken along line 4—4 in FIG. 1.

Covers 45 and 46 are provided to seal the open ends of the cavities 25,26. These covers may be constructed as rubber coated rigid (such as metal) plates onto which seal lips or rings 48 are molded (FIG. 3), or they may be formed of a corrosion resistant material such as a glass fiber filled resin, to seal against similar seal rings or lips molded onto the outward facing surfaces of the end plates 34,35. In either case, the covers are sized to fit within the top and bottom plates, being insertable within the flanges 36,37 to fit in sealing relation over the openings 22 and 23, and to be clamped into tight sealing relation with the top and bottom plates and the adjacent portions of the block, to which these end plates are bonded, in order to close the cavities 25 and 26.

Figure 5:
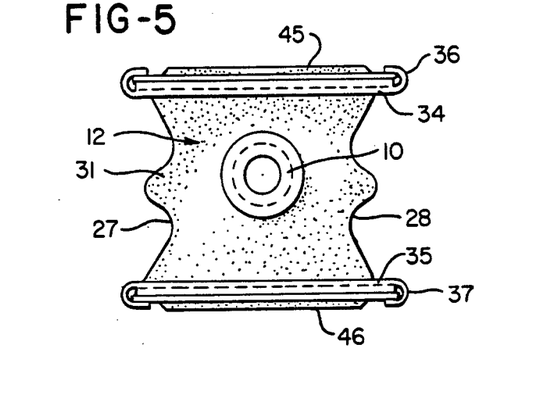
FIG. 5 is a side elevational view of the central assembly with the covers attached.

Before this is accomplished, the cavities and the connecting passage are filled with a suitable damping liquid. Ethylene glycol or glycerine are typical liquids used for this purpose. The flanges 36 and 37 are then tightly formed around the edges of the covers to complete the central assembly, as shown in FIG. 5. It should be noted that rubber material may be bonded around the surfaces of the flanges 36,37 and thus there is a rubber surface facing outwardly of the subassembly.

This assembly is then placed between two complementary parts 51 and 52, formed of steel or the like and intended to be joined, as by rivets 53 to form a rigid outer body on the completed mount. The top to bottom dimension 54 (FIG. 11) within the part 52 is less than the top to bottom outer dimension of the central assembly (FIG. 5) by an amount which is calculated to require a predetermined compression of the central assembly along the Z—Z axis to bring the parts 51 and 52 into contact, after which these parts are then joined into an effectively integral outer body or shell. The sides 27 and 28 may be relieved, however, and not contact the outer body part 52 under normal static conditions as shown in FIG. 12.

The outer body, therefore, exerts a selective compressive force upon the central assembly, and particularly upon the resilient block or mass 12, along the Z—Z axis longitudinally bisecting the tube 10. The ends of the outer body are essentially open, having only short flanges 57 and 58 formed from the body parts 51 and 52, to retain the central assembly but leaving the ends of tube 10 free to move within the limits permitted by the constraints on the block 12 and the resistance of that block to external forces acting on the tube while the outer body is confined or held. The flanges 57,58 must at the minimum be of sufficient dimension to restrain all movement of the end plates 34,35 within the outer body along the Y—Y axis. The flanges 57,58 may be extended toward bushing 10 so as to provide a restraining surface that will cooperate with a suitably contoured surface on the ends 31,32 thereby providing controlled resistance to motion along the Y—Y axis and/or control of spring rate along the Z—Z axis. Furthermore, the outward facing coating of rubber on the flanges 36,37 provides a metal to rubber interface between the subassembly and the outer body at their contacting locations, contributing to the isolation capability of the mount since there are two complete rubber/metal interfaces between the tube or bushing 10 and the outer body or shell of the mount.

Figure 11:
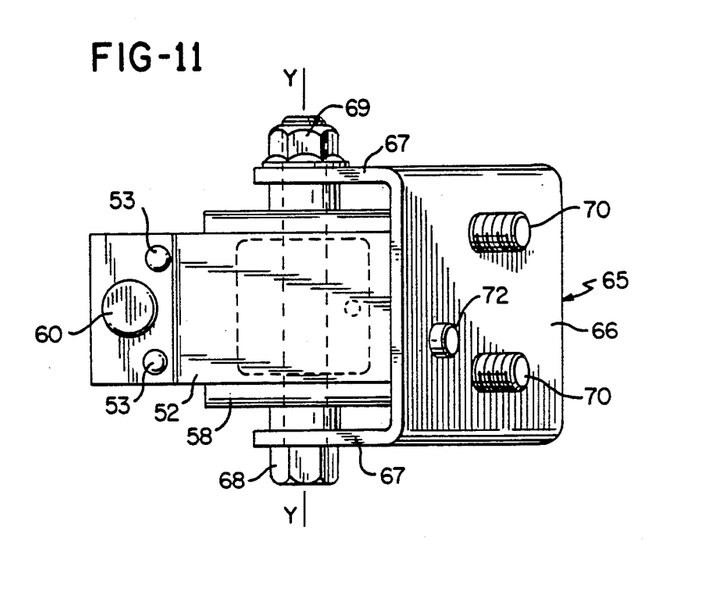
FIGS. 11 and 12 are top and side elevational views, respectively, showing the completed isolating mount and an attached coupling bracket.
Figure 12:
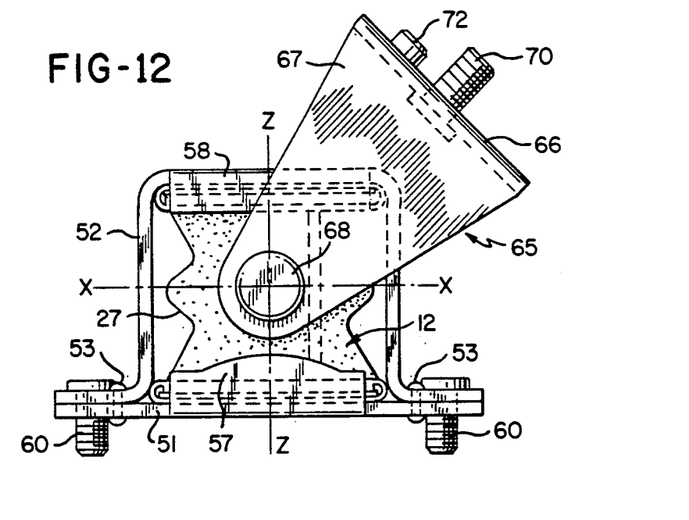

Referring to FIGS. 11 and 12, the outer body is provided with suitable support or coupling means for attaching it to one of two members (not shown) to be coupled and vibrationaly isolated. For example, appropriate mounting bolts 60 extend through holes 62 formed in the overlapping attached parts of the members 51 and 52. The size and location of these bolts and corresponding holes may vary for any particular design. A mounting bracket in the form of a clevis 65, having a base part 66 and outwardly extending arms 67, is attached to the tube 10 by a through bolt 68 which is secured with a locking nut 69. This arrangement may allow some rotation of the clevis around the axis of the tube, or this connection may be rotationally rigid, as by use of non-circular tube and bolt, an intervening key or similar means, depending upon the requirements of the particular use and installation of the mount. The base 66 of the clevis is provided with attaching bolts 70 and may include an orienting or alignment pin 72; the bolts 70 might for example be used to attach the clevis to the other member of the pair, such as to a mounting pad on an engine block.

Figure 1:
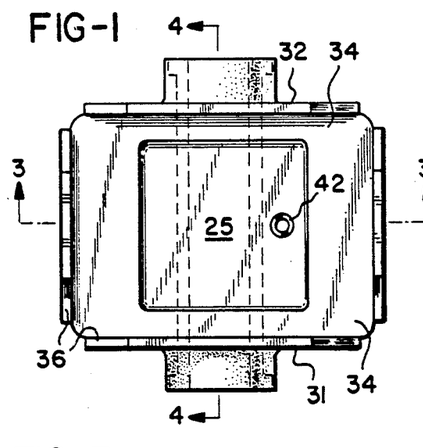
FIG. 1 is a plan view of the central assembly of an isolating mount according to the invention.
Figure 2:
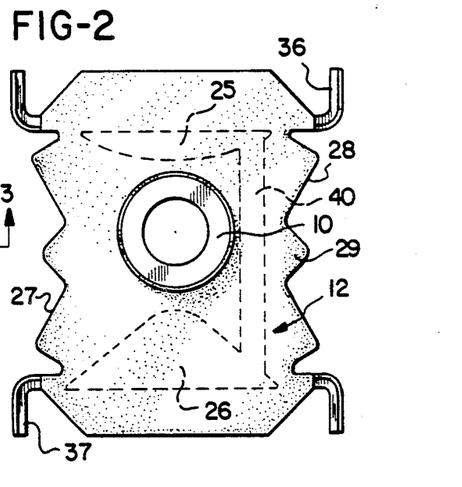
FIG. 2 is a side elevation view of the central assembly as shown in FIG. 1.

It should be noted by comparing FIGS. 2 and 5 with FIG. 12 that the longitudinal axis of bushing 10 may be originally offset upward from the X—X and Y—Y axes. The reason for this is to design the mount for a predetermined static load, such as its portion of engine weight. Thus when the subassembly is built, the bushing is displaced upward from the ultimate Y—Y axis alignment, and when the mount is in place (assumed in FIG. 12) the static load on the mount will result in the bushing axis and the Y—Y axis coinciding.

One of the advantages of a mount built according to the invention is its capability to accommodate off center or off-axis loading. Of necessity, certain mount installations such as the engine mounts of an automobile, must be capable of accommodating a wide variety or static and dynamic forces such as static load, operational vibration, torque and road surface vibrations and impacts. In designing a mount installation for a specific purpose such as an automobile engine mount, it is imperative that the relative magnitude of each of the variety of static and dynamic forces be considered in conjunction with the directional orientation of each such force and its resulting motion.

The optimal result of support, load bearing and damping of mounts disclosed in this application will be achieved by orienting the placement of the mount to located the Z—Z axis on the centerline (or plane) along which the major static and dynamic forces and the relative motion resulting therefrom is expected to occur. A distinct advantage of the mounts disclosed in this application is the unique demonstrated ability to functionally control (support and dampen) static and dynamic forces and the relative motion resulting therefrom, at angles in the order of 40° to 45° displaced from the optimum Z—Z axis. Taking into consideration the normal dimensional tolerance experienced in mass production of large machinery, and also considering the fact that in the case of modern engine installation (particularly in automobile construction) the compartment structure may flex considerably under various loads and stresses, it can be appreciated that this accomodation characteristic of the present mount provides significant advantages.

The present invention is particularly concerned with modification of the hydraulic damping action of the mount, to enable tuning to particular installations or conditions in which vibration at one or more predetermined frequencies is of particular annoyance because of its increased amplitude or its sympathy to related structures. It has been found that tuning of the response of the mount can be achieved by lengthening the extent of passage 40 to provide an extended column of fluid in the passage which, by reason of its inertia, modifies the time/rate characteristics of the transfer of liquid between the chambers 25 and 26.

Thus the volume of the passage within the block 12 enters into the determination of the process of tuning the mount to provide reinforcement or additive damping to the action of the block material itself. It has been discovered that without attention to these relationships, it is possible for the mount at certain frequencies to exhibit a condition in which the hydraulic damping action of the liquid filled and connected cavities will actually occur in phase with the vibration which it is sought to damp, and thus produce a counter-productive amplification of the vibration at certain frequencies. The situation is complicated by the fact that in addition to the transfer of liquid from one cavity to the other, through passage 40, the distortion of the rubber block 12 under applied loads may result in a slight change of the volume of cavities 25,26 and thereby introduce another parameter into the design of the mount.

In general, it can be stated that test results show that the inertial resistance to flow of the liquid through the passage 40 is a more dominant parameter than the size of the restriction (orifice) presented to the flow by the cross-sectional size of the passage or any restriction introduced into the passage. Therefore, close attention is required to the length of passage 40 and to its changes in volume due to rubber displacement during dynamic operation of the mount. While addition of an insert such as at 42 may be necessary in some circumstances, proper design of the passage length and cross-section and determination of the changes in these dimensions during mount operation can be accomodated into the construction of the mount, such that a stiffening insert of this type is unnecessary. This of course can reduce manufacturing cost and also eliminate one item of potential maintenance or failure.

The key parameters identified in investigation of mounts as shown both in FIGS. 1-4 and FIG. 6 are the stiffness (spring rate) and the damping due to the rubber structure of the mount, the fluid inertia in the connecting passage 40, flow restriction in the connecting passage, and volume compliance of the cavities 25,26.

Figure 14:
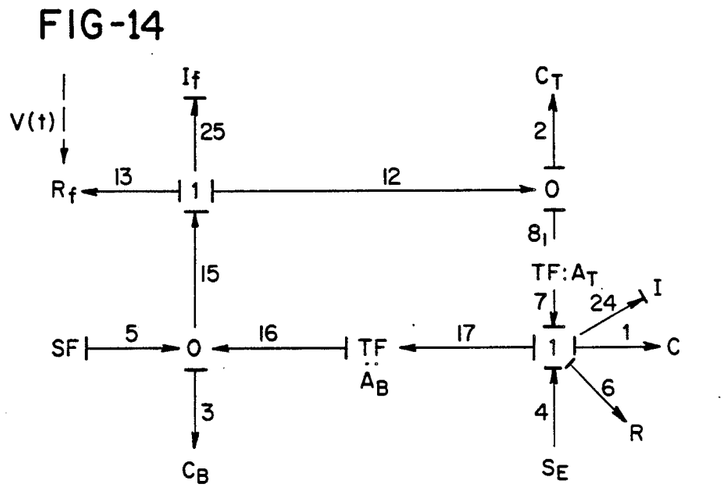
FIG. 14 is a bond-graph diagram.

A bond-graph technique can be used to represent the mount dynamics. Such a technique is explained in the text Indroduction to Physical Systems Dynamics, published 1983 by McGraw Hill Book Co., New York, NY. This technique provides a convenient way to present the interaction between hydraulic and mechanical domains. FIG. 14 shows the bond-graph applicable for both versions of the mount, i.e. with internal or external passage. Only the dynamics of the mount generally along the Z—Z axis are modeled since the fluid (liquid) effects are active primarily in this mode of excitation. The liquid is assumed incompressible and fluid drag forces in the mount containing the internal passage are assumed negligible, and this allows the same model to be used for both cases. The bushing inertia is included (although small) because equation formulation is simplified in the linear case. The bond-graph model embodies the basic dynamic structure of the mount, whether it be linear or nonlinear. Examples of nonlinearity are the orifice restriction in the passage and the volume compliances of the cavities.

Mounts of this type are generally characterized in terms of their stiffness and damping rates versus frequency. This is explained in a paper entitled "A Review of Recent Developments in Forced Vibration Dynamic Testing of Elastomers" by B.M. Hillberry, Rubber and Related Products:New Methods of Testing and Analzing, ASTM STP 553, American Society for Testing and Materials, 1974, pp. 142-161. Such a representation provides an intuitive way of predicting effects of a mount in an interconnected system. The stiffness and damping effects are modeled by the parallel element viscoelastic model, which consists of a linear spring and viscous damping, shown in FIG. 15 and referred to as the Voight model. The equation for describing this model is $$C \cdot \frac{dx(t)}{dt} + K \cdot x(t) = f(t)$$

Figure 15:
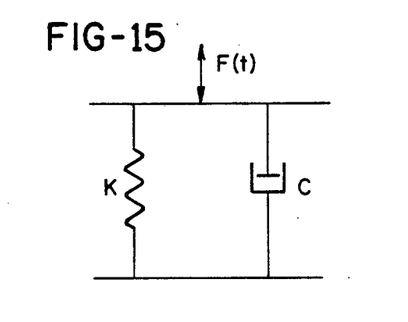
FIG. 15 is a VOIGHT model diagram.

The parameters C and K are referred to as the dynamic stiffness and damping rates. Characterization of a hydraulic mount involves the experimental estimation of the parameters C and K, which are strong functions of the excitation frequency.

It has been discovered that the liquid in the passage 40 functions as a fluid oscillator and using an analogy between the fluid oscillator and a spring-mass-damping system provides insight into the effects of the design of this passage. Particularly of interest are the nondimensional damping ratio and the natural frequency of the fluid oscillator.

It should be noted that the distinction between resonant frequency and natural frequency requires attention, because these terms are sometimes used interchangably, but they are not the same. A resonant frequency corresponds to a frequency where the transfer function of the system has a relative maximum in magnitude for a given sinusoidal input. In highly damped systems a distinct resonance will not appear. A natural frequency corresponds to a frequency where the output of the system lags the input by 90°. For light damping, the difference between the resonant and natural frequencies is negligible. As damping in a system increases, the resonant frequencies decrease and the attenuation of the resonance peaks increases.

An analysis made of the flow through the passage 40 (also termed bleed flow) assumes that this flow is fully developed laminar flow. Definitions for the mathematical expression are

| Q(t) | flow rate |
|---|---|
| P(t) | applied pressure |
| I | bleed fluid inertia |
| R | bleed friction factor |
| K | volume compliance of cavities |
| l | length of bleed passage |
| A | area of bleed passage |
| d | diameter of bleed passage |
| u | viscosity of liquid |
| p | liquid density. |

The resulting second order differential equation describing a simple fluid oscillator is $$I\frac{d^2Q(t)}{dt^2} + R\frac{dQ(t)}{dt} + KQ(t) = p(t)$$

$$I = \frac{pl}{A} \text{ and } R = \frac{128\,\mu l}{\pi d^4}$$

The nondimensional damping ratio can be derived as $$\epsilon = \frac{32}{\sqrt{\pi}} \cdot \frac{\pi\sqrt{I}}{d^3\sqrt{K\rho}}$$

The resonant frequency can be derived as $$W_n = \sqrt{\frac{\pi K d^2}{4\rho l}}$$

A second order system with a damping ratio below 1.0 is considered underdamped, and over 1.0 is considered overdamped, while a 1.0 damping rate is considered to be critically damped. Thus, the nondimensional damping ratio is proportional to the bleed passage properties as follows $$\epsilon \approx \frac{\sqrt{l}}{d^3}$$

and it is demonstrated that the damping ratio is more sensitive to the passage or bleed diameter than its length. As the diameter increases, the damping ratio decreases rapidly.

However, resonant frequency is proportional to the bleed passage properties as follows $$W_n \approx \frac{d}{\sqrt{l}}$$

thus the resonant frequency is proportional to the diameter of the passage and inversely proportional to the square root of the passage length.

It follows that varying the ratio l/d in the design of passage 40 changes both the resonant frequency and the nondimensional damping rate at the same time. For example, if both the diameter and length are increased by 10% the natural frequency will be increased by 5% while the nondimensional damping will be increased by 25%.

The frequency at which maximum damping occurs in a fluid mount is generally used as the estimate for the natural frequency of that mount, however the peak of the damping curve occurs at the resonant frequency of the mount, not the natural frequency. If the nondimensional damping coefficient of the fluid oscilliator is small, the difference between the resonant and the natural frequencies is small, and as the nondimensional damping in a system increases, the resonant frequency decreases while the natural frequency remains the same.

The relationship between the resonant frequency and the natural frequency is given in the following equation.

$$W_r^2 = W_n^2 - \frac{R^2}{2l^2}$$

In this equation $w_n$ denotes the natural frequency and $w_r$ denotes the resonant frequency, both expressed in radians/second; R denotes the passage (or bleed) friction and I denotes the fluid inertia of the liquid in the passage. If the bleed restriction coefficient is set to zero, the resonant and natural frequencies are equal, and as the orifice restriction (passage 40) becomes large, the resonant frequency decreases. If the right hand side of this equation becomes negative, the damping curve will not exhibit a resonance peak.

It has also been observed that the resonant frequency of a liquid damped mount with a fixed bleed or passage will decrease with increasing displacement amplitude, apparently due to the nonlinear dependance of this restriction on flow. The bleed friction factor R can be expressed, assuming laminar fully developed flow in a circular pipe of diameter d and length 1, with liquid having a viscosity u, by the equation $$R = \frac{128 \mu l}{\pi d^4}$$

While this equation states that the friction factor is dependant only on fluid viscosity and bleed or passage dimensions, in actuality the volume flow rate through the passage and as the flow rate increases, R will increase somewhat.

Figure 6:
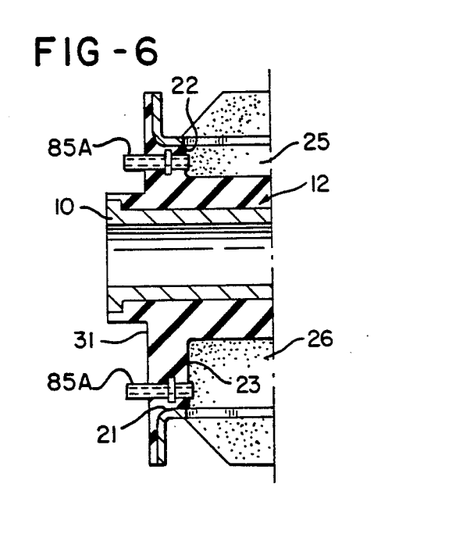
FIGS. 6 and 7 are schematic views illustrating arrangements using external conduit to extend the length of the connecting passage.
Figure 7:
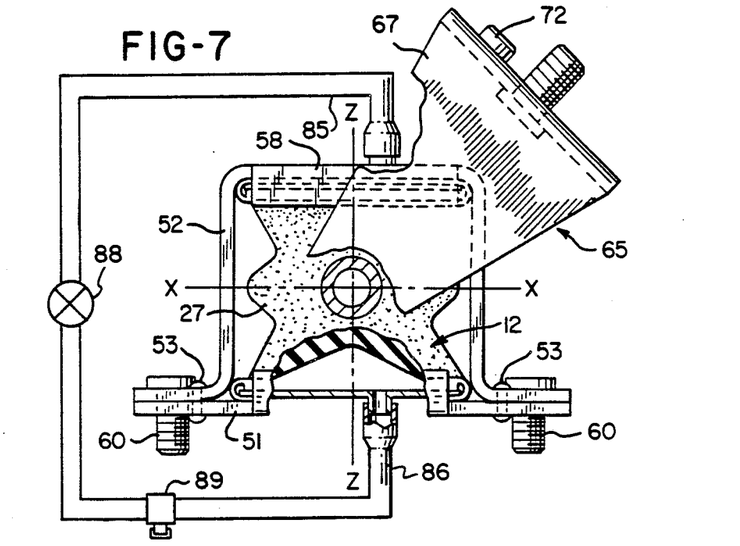

FIG. 7 illustrates an external arrangement for providing control over the size of the orifice, and the length of passage, between the chambers 25 and 26. Here external pipes 85 and 86 extend from these chambers to an optional adjustable orifice or valve member 88. These pipes may be connected to the cavities 25,26 by suitable fittings attached to the covers 45,46 as in FIG. 7, or through nipples 85A, 86A molded into the side 31 of block 12 and communicating with the cavities, as shown in FIG. 6. The length of the pipes 85 and 86 can be adjusted to change the length of the liquid column as dictated by a particular design of mount. If control over the restriction of the external passage is also desired, then a fixed or adjustable orifice can be added as shown. Also, if it is desired to boost the pressure of the liquid in the cavities, as to increase the stiffness of the mount, a tee fitting 89 can be included in the connected pipes 85,86 as shown.

Figure 8:
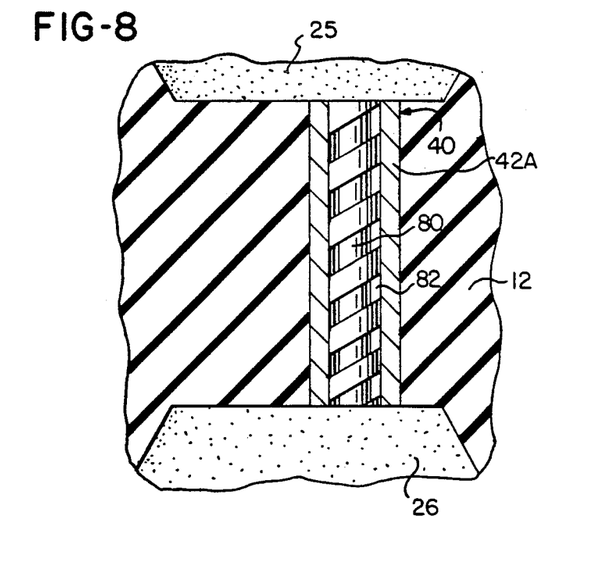
FIG. 8 illustrates schematically another arrangement using an insert placed internally of the mount to extend the passage length.

FIG. 8 illustrates a mechanism whereby this "tuning" of the length of passage 40 can be achieved within the structure of the mount, thus providing a passive mount tuned to damp particularly at preselected frequency of vibration. A modified sleeve 42 A is placed in passage 40, and into the sleeve is inserted a cork-screw like passive flow controller 80 having a spiral groove 82 which cooperates with the interior surface of the sleeve 42 A to define a passage of extended length and predetermined cross-section. This length and cross-section can be varied by forming the groove 82 to different depths and at different pitches, with the dimensional limits of the passage as molded in the block 12, thereby providing a convenient means of tuning the mount to a desired damping condition, without adding to the exterior of the mount or appreciably changing its construction.

Figure 9:
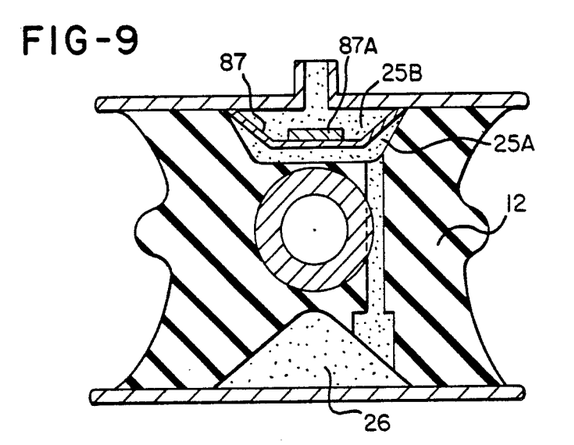
FIG. 9 illustrates an arrangement for introducing further modification of the damping action of the mount.

Another arrangement for adjusting the damping response is shown in FIG. 9, wherein the upper chamber is divided into separated chambers 25 A and 25 B by a flexible diaphragm 87. The lower chamber may likewise be divided if desired, but this is not shown for purposes of simplification. The passage thus connects the chamber 25 A to the lower chamber, and appropriate means (such as in FIG. 6) can be used to control the passage if desired. The chamber 25 B can be charged with air under pressure, or with a liquid of a different nature than the liquid used in the main chambers, whereby to modify the action of the diaphragm 85 on the liquid in chamber 25 B. In addition a predetermined mass, as at 87A, can be added to the diaphragm to alter is inertial response and thereby further tune the damping action of the mount.

Figure 10:
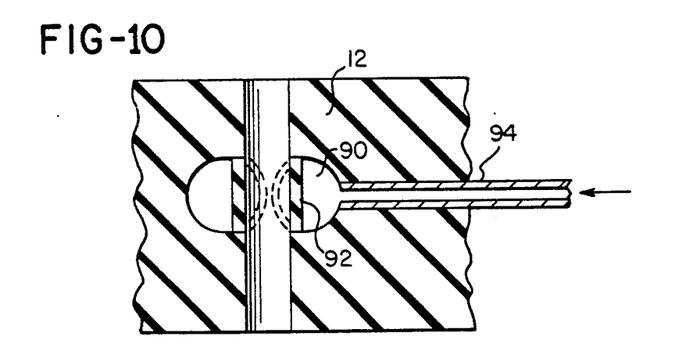
FIG. 10 illustrates another arrangement for introducing variable cross-section into the connecting passage of the mount.

FIG. 10 illustrates a device where the change in restriction of the passage 40 can be altered at will from externally of the mount, should such control be desired. A small control cavity 90 is formed along the passage, within the material of the block 12. If needed, this cavity can be defined by an inserted or molded in place box (not shown), and a flexible tubular member 92 is placed to form a continuation of the passage and separate it from the cavity 90. Introduction of fluid under predetermined different pressures through the pipe 94, which extends to outside the mount structure, will cause the flexible member to collapse inwardly, as shown in dotted lines, to change the cross-section of the controlling orifice thus provided in the passage, and thereby to vary the damping response of the mount.

Figure 13:
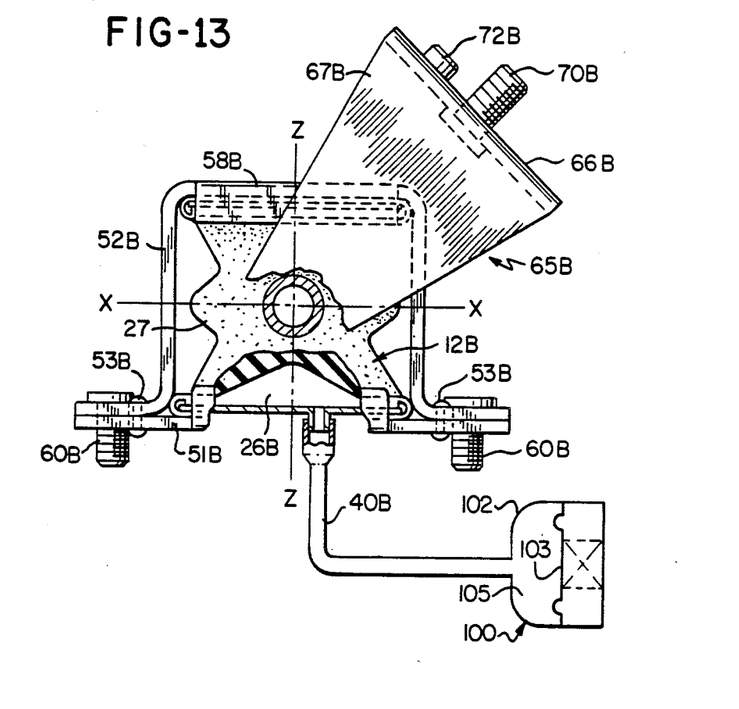
FIG. 13 is an illustration, partly schematic, showing another embodiment of the invention.

In some mounts embodying the present invention it may not be desireable to include two cavities within the resilient block of the mount. It is possible to achieve hydraulic damping primarily in one direction, using only a single cavity as shown in FIG. 13. Again, like parts are designated by the same reference numerals, here with the suffix B. The upper cavity is omitted, and the lower cavity 26B is connected through an external passage tube 40B to an accumulator type of device 100 which includes a housing 102 having an internal diaphragm or bladder 103 that forms one wall of a closed chamber 105. The other end of tube 40B is connected to chamber 105, and the side of the bladder 103 opposite chamber 105 is exposed to force from a suitable source (not shown) such as predetermined fluid or spring pressure, tending to reduce the volume of chamber 105. Thus the hydraulic damping circuit in this type of mount will comprise the internal mount chamber 26B, passage or tube 40B, and the chamber 105.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In an isolating mount of the character described for connecting two members, comprising
    a rubber block having a bushing incorporated therein and including closed cavities on opposite sides of said bushing,
    means defining a passage between said cavities and a quantity of liquid filling said cavities and said passage, said passage having a predetermined length l and a predetermined diameter d,
    an outer body connected to said block, and
    means for coupling said bushing to one of the two members and for attaching said outer body to the other of the two members;
    the improvement comprising
    a liquid filling said cavities and said passage providing a continuous liquid column in said passage between said cavities, said liquid column forming as part of said mount a fluid oscillator having a predetermined resonant frequency which is directly proportional to the square of d and inversely proportional to l, and a damping ratio which is directly proportional to the square root of l and inversely proportional to the cube of d, the values of l and d being selected to provide a damping ratio of substantially 1.0 and a frequency equal to the frequency tending to be transmitted between said two parts.

2. A mount as defined in claim 1, including
    means for controlling the length of said passage to provide a column of liquid therein of specified inertial mass.

3. A mount as defined in claim 1, including
    piping means extending from one of said cavities to the other outside of said outer body to form an extended passage of predetermined length between said cavities.

4. A mount as defined in claim 1, including
    flexible diaphragm means dividing at least one of said cavities,
    means exerting a predetermined force against the side of said diaphragm opposite said passage to alter the response of transfer of liquid through said passage.

5. A mount as defined in claim 1, including adjustable orifice means connected into said passage to vary the restriction to flow of liquid between said cavities.

6. A mount as defined in claim 5, including means defining a control cavity in said block surrounding a portion of said passage,
    a flexible control tube mounted in said control cavity to separate said control cavity from said passage and provide for passage of liquid across said control cavity,
    and control means external of said mount including a control pipe communicating with said control cavity to allow variation of pressure within said control cavity to cause said flexible tube to decrease in cross-section and restrict said passage in accordance with the pressure change in said control cavity.

7. A mount as defined in claim 5, including
    said adjustable orifice being mounted external of said mount, and
    conduits extending from each of said cavities in said block to opposite sides of said adjustable orifice.

8. An isolating mount of the character described for connecting two parts in an environment susceptible to vibration at certain frequencies, comprising
    a rigid tubular bushing,
    a resilient rubber block molded around said bushing,
    said block including means defining cavities opening to the exterior of said block on opposite sides of said bushing,
    a rigid metallic outer body affixed to said block and exerting compressive force thereon in a predetermined direction.
    means defining a passage between said cavities, said passage having a length l and a diameter d and being of substantially lesser cross-section than said cavities,
    a quantity of liquid filling said cavities and said passage,
    cover means held in sealed relation to the exterior of said block over said cavities whereby said liquid is confined within said cavities and said passage and displacement of said block in response to forces acting on the mount will result in distention of said cavities and corresponding displacement of said liquid from one of said cavities to the other through said passage,
    said passage providing a continuous liquid column between said cavities of predetermined length and mass to form as part of said mount a fluid oscillator having a predetermined resonant frequency which is directly proportional to the square of d and inversely proportional to l, and a damping ratio which is directly proportional to the square root of l and inversely proportional to the cube of d, the values of l and d being selected to provide a damping ratio of substantially 1.0 and a resonant frequency equal to the frequency tending to be transmitted between said two parts.

* * * * *